(12) United States Patent
Gröss et al.

(10) Patent No.: US 8,021,548 B2
(45) Date of Patent: Sep. 20, 2011

(54) LATTICE STRUCTURE, USE OF THE LATTICE STRUCTURE AND VESSEL WITH LATTICE STRUCTURE

(75) Inventors: Stefan Gröss, Wilihof/LU (CH); Bernd Altmüller, Birkenau (DE); Harald Ehrentraut, Darmstadt (DE); Alexandra Merz, Taunusstein (DE)

(73) Assignee: Brita GmbH, Taunusstein (DE)

( * ) Notice: Subject to any disclaimer, the term of this patent is extended or adjusted under 35 U.S.C. 154(b) by 603 days.

(21) Appl. No.: 12/086,845

(22) PCT Filed: Dec. 15, 2006

(86) PCT No.: PCT/EP2006/069779
§ 371 (c)(1),
(2), (4) Date: Oct. 29, 2008

(87) PCT Pub. No.: WO2007/074087
PCT Pub. Date: Jul. 5, 2007

(65) Prior Publication Data
US 2009/0200229 A1    Aug. 13, 2009

(30) Foreign Application Priority Data
Dec. 23, 2005  (DE) .......................... 10 2005 062 855

(51) Int. Cl.
*B01D 29/01* (2006.01)
*B01D 27/08* (2006.01)
*B01D 35/01* (2006.01)

(52) U.S. Cl. ........ 210/244; 210/282; 210/436; 210/472; 210/498; 210/499; 55/385.4; 55/414; 220/212; 220/372; 428/131

(58) Field of Classification Search .................. 210/244, 210/282, 436, 472, 474, 477, 498, 499; 55/385.4, 55/410, 414, 418; 428/116, 131; 220/212, 220/367.1, 370, 371, 372
See application file for complete search history.

(56) References Cited

U.S. PATENT DOCUMENTS

| | | | | |
|---|---|---|---|---|
| 3,169,111 A * | 2/1965 | Rose et al. | ..................... | 210/499 |
| 3,360,911 A * | 1/1968 | Sweeney | ......................... | 55/489 |
| 3,716,144 A * | 2/1973 | Bartlow | ........................ | 210/499 |
| 4,634,525 A * | 1/1987 | Yant | .............................. | 210/499 |
| 4,818,403 A * | 4/1989 | Nagaoka | ....................... | 210/488 |
| 4,895,648 A * | 1/1990 | Hankammer | ................ | 210/472 |
| 5,049,272 A * | 9/1991 | Nieweg | ......................... | 210/282 |
| 5,423,893 A   | 6/1995 | Kotaki | | |
| 5,476,588 A * | 12/1995 | Nagaoka | ..................... | 210/499 |

(Continued)

FOREIGN PATENT DOCUMENTS

DE    1 629 378    5/1971

(Continued)

*Primary Examiner* — Christopher Upton
(74) *Attorney, Agent, or Firm* — Hudak, Shunk & Farine Co. LPA

(57) ABSTRACT

A lattice structure for the passage of a first medium against a second medium with transverse webs and longitudinal webs, lattice openings with a clear width of ≦300 μm being arranged between the transverse webs and the longitudinal webs. On at least one side of the lattice structure, the transverse webs and/or the longitudinal webs have a rib arrangement of ribs projecting vertically to the lattice plane, at least one first group and a second group of ribs being arranged which differ from one another at least by their heights $H_1$, $H_2$ with $H_1 > H_2$. A vessel with at least one water inlet window and an air outlet window, both windows being provided with the lattice structures.

35 Claims, 8 Drawing Sheets

U.S. PATENT DOCUMENTS

| | | | |
|---|---|---|---|
| 5,873,995 A * | 2/1999 | Huang et al. | 210/472 |
| 6,405,875 B1 * | 6/2002 | Cutler | 210/472 |
| 6,638,426 B1 * | 10/2003 | Fritter et al. | 210/282 |

FOREIGN PATENT DOCUMENTS

| | | |
|---|---|---|
| DE | 1 629 379 | 5/1971 |
| DE | 2 220 656 | 11/1972 |
| DE | 197 44 361 A1 | 3/1999 |
| EP | 0 823 276 A1 | 2/1998 |
| JP | 05-293858 | 11/1993 |
| JP | 05-293859 | 11/1993 |
| JP | 10-048021 | 2/1998 |
| WO | WO 96/21621 | 7/1996 |
| WO | WO 98/05401 | 2/1998 |
| WO | WO 01/32560 A2 | 5/2001 |

* cited by examiner

PRIOR ART

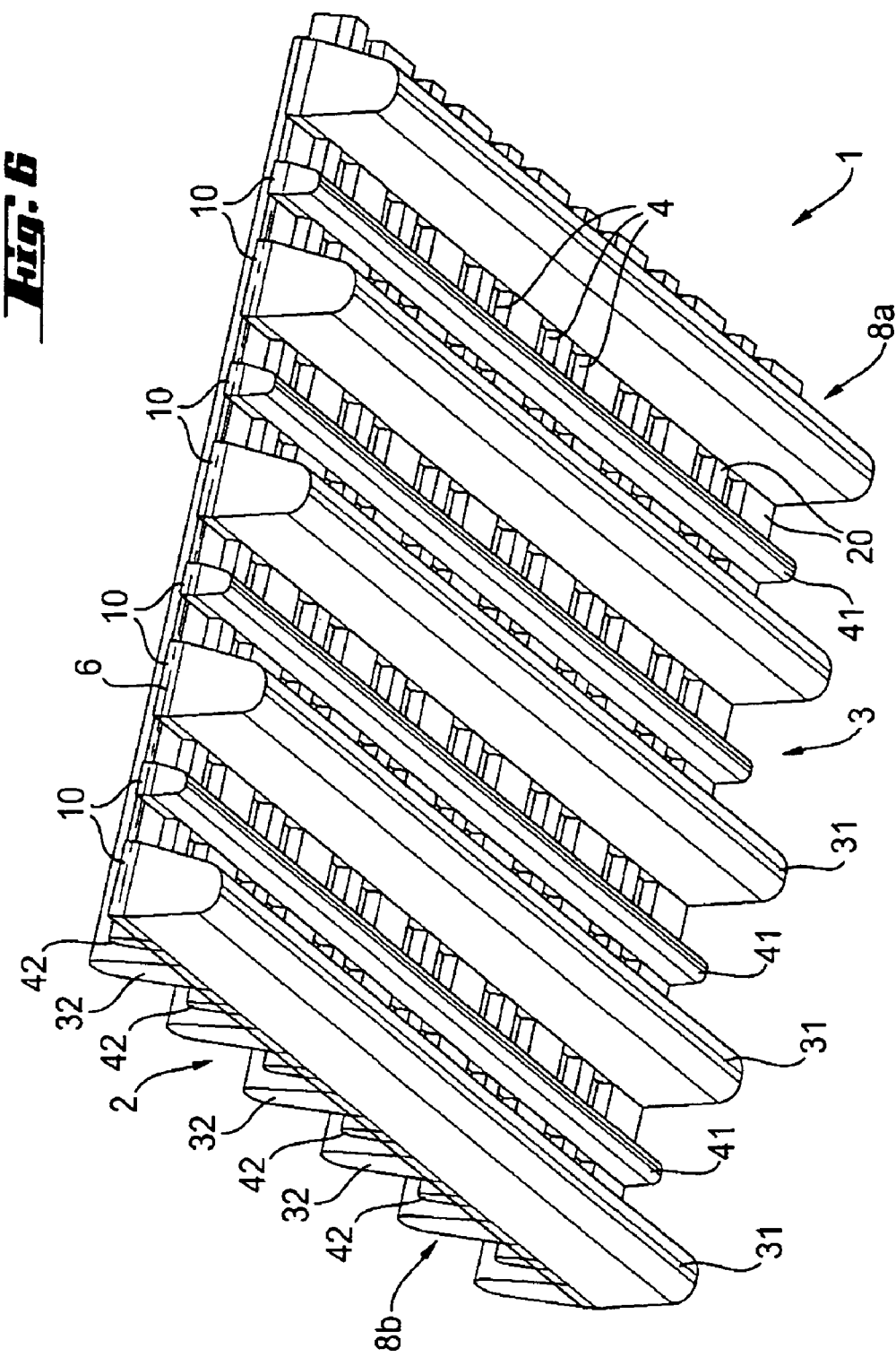

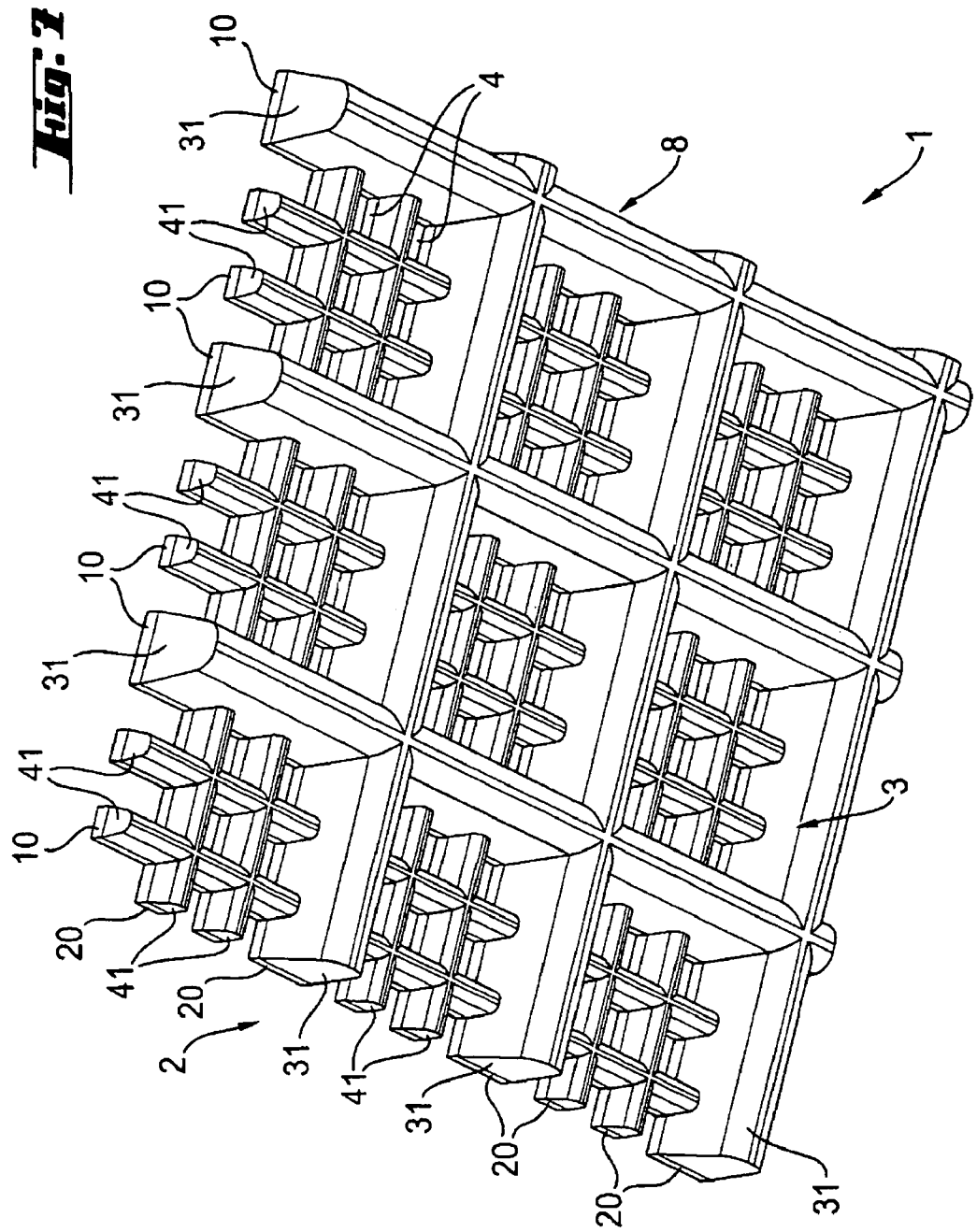

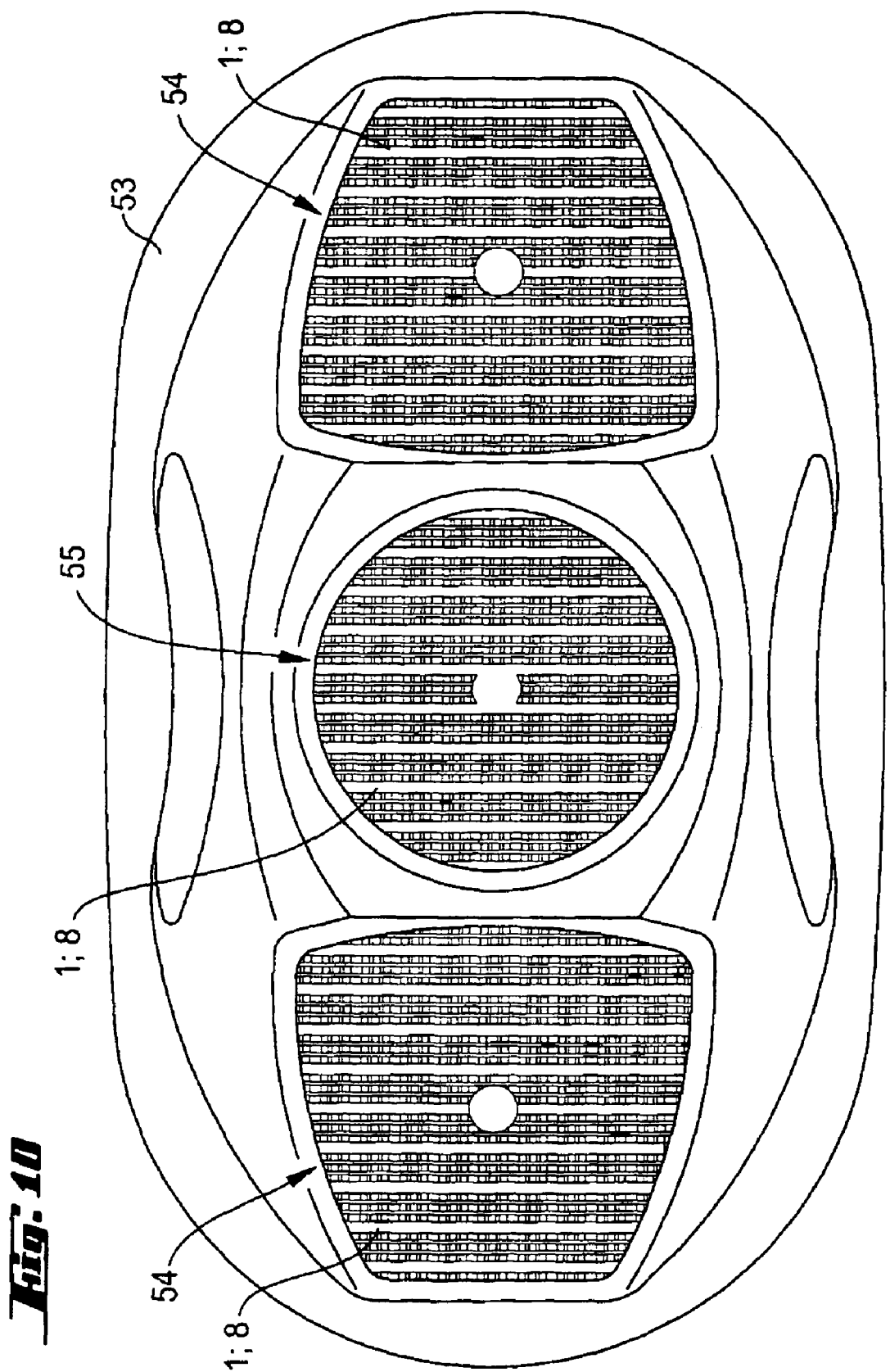

LATTICE STRUCTURE, USE OF THE LATTICE STRUCTURE AND VESSEL WITH LATTICE STRUCTURE

FIELD OF INVENTION

The invention relates to a lattice structure with transverse webs and longitudinal webs, which form an angle β between 80° and 100° with one another, where lattice openings with a clear width of ≦300 μm are located between the transverse webs and longitudinal webs. The invention refers also to a vessel, particularly a filter cartridge, with such lattice structures.

BACKGROUND OF THE INVENTION

The clear width of the lattice opening is understood to mean, for example, the diameter for a circular-shaped opening and the spacing of the narrow sides for a rectangular opening.

From EP 1 230 166 B1, a filter device is known, which has a filter cartridge. In order to prevent the exit of filter material located in the filter cartridge in the form of granular material, a form-stable or a flexible flat-shaped structure is arranged in the cover area of the filter cartridge, which structure has a maximum pore size or mesh width of 300 μm in order to prevent an exit of micro particles of the granular material also.

During the starting phase of the filtration process, water must be capable of penetrating the filter cartridge and the air within the filter cartridge must be capable of escaping. With regard to this problem it is stated that, when using sieve-type flat-shaped structures, a minor back pressure already suffices to close the sieve pores. In fabric technology, the closing of the pores with a moist film is called sail formation.

The dome-shaped sieve-type flat-shaped structure, for example, can comprise a synthetic material fabric, wherein the sail formation in the upper part of the flat-shaped structure, where the air exits, is to be avoided by means of hydrophobic constituents. The lower part of the flat-shaped structure in the zone of the inlet openings for the water to be filtered has hydrophilic components for the passage of liquid. However, these measures do not suffice for the purpose of ensuring a non-hindered filling with water.

A filter cartridge with a fabric assembly is known from the EP 0 823 276 B1, said assembly being at least partially dome-shaped. The fabric section is secured to ribs.

The WO 98/05401 describes a filter cartridge with water inlet openings, water outlet openings and air outlet openings or windows, which are covered with a lattice that can consist of a synthetic material fabric. This fabric can be manufactured integrally with the cover.

The filter cartridge according to the WO 96/21621 also has water inlet openings and air outlet openings which are provided with a micro-porous paper.

From the U.S. Pat. No. 5,423,893 an injection-moulded lattice structure is known, which consists of inter-crossing webs. For technical reasons pertaining to the injection-moulding method, the lattice structure has ribs, which are circular-shaped in the cross-section, the diameter of said ribs is a multiple of the diameter of the webs. With these ribs, the entire lattice structure is subdivided into fields.

DE 197 44 361 describes a synthetic material filter with a filter lattice having a plurality of small passage openings. In order to create a synthetic material filter that can be manufactured in an injection-moulding process, the filter lattice consists of a first layer of ribs parallel to one another and a second layer of ribs parallel to one another, which cross the ribs of the first layer, both layers being located in two surfaces adjacent to one another and the inter-crossing ribs of the two surfaces are joined together at their crossing points. Therefore, the ribs or webs are located in two different planes.

These lattice structures also have the disadvantage that delays or even blockages can occur at the starting phase of the filling.

SUMMARY OF THE INVENTION

The task of the invention is to provide a lattice structure, which has improved flow-through properties of media, particularly at the beginning of the passage of liquid against gas and gas against liquid, respectively. It is also the task of the invention to provide a vessel with such lattice structures through which there is a flow of various media such as liquid and gas, where the flow properties are to be improved through the lattice structures.

This task is solved with a lattice structure where, at least on one side of the lattice structure, the transverse and/or the longitudinal webs have a rib arrangement of ribs projecting vertically to the lattice plane, at least a first group and a second group of ribs being arranged, which differ from one another at least by their rib heights $H_1$, $H_2$ with $H_1 > H_2$. In this case, the height $H_1$ is allocated to the first group and the height $H_2$ to the second group.

The transverse and longitudinal webs are understood to be flat lattice elements of the same thickness D, which form the base frame of the lattice structure. These webs can lie in a common plane, or the longitudinal webs can lie in a first plane and the transverse webs can lie in a second plane, which is offset by the height of the longitudinal webs.

The ribs are understood to be elevations on these webs.

It was surprisingly discovered that, during the beginning of the flow through the lattice structure when, namely, the lattice structure is in a first medium and a second medium is to flow through it against the resistance of the first medium, no delay and not even blockages occurred as is the case with lattice structures, which have only transverse and longitudinal webs either without ribs or with ribs of a single rib height.

It is advantageous in this case if the ribs of the first group alternate with ribs of the second group in a regular sequence for the formation of a rib arrangement. Particularly with the flow-through of the lattice structure by means of air against water and/or water against air, the best results are achieved if two ribs of the second group alternate with one rib of the first group in each case.

The rib arrangement is located preferably either on the transverse webs or on the longitudinal webs. It is also possible to envisage the rib arrangement both on the longitudinal webs as well as on the transverse webs.

The rib arrangement can be identical on both sides of the lattice structure, wherein the rib heights on both sides can be selected equally or differently.

The rib structure can also be turned on the one side by the angle β opposite the rib arrangement on the other side. The most suitable combination of the arrangements depends on the individual application, meaning, on the media used in each case.

The heights $H_1$, $H_2$ of the ribs differ preferably and significantly from one another, $H_2 < 3/4 H_1$ being preferred. Further preferred value ranges for the heights $H_1$ and $H_2$ are $H_2 < 1/2 H_1$ and $H_2 < 1/3 H_1$.

With the existence of three or more groups of ribs, analogous gradations preferably apply, for example, $H_3 < 3/4 H_2$ and $H_2 < 3/4 H_1$.

The width of all webs can be the same. However, it is preferred for reasons of stability among other things, to select the width B1 of the webs with ribs of the first group larger than the width B2 of the webs with ribs of the second group.

A further improvement of the flow-through can be obtained if the side surfaces of the ribs have an angle of inclination $\alpha$ with $0 \leq \alpha \leq 12°$. The angle $\alpha$ is measured between the side wall of the rib concerned and the vertical on the lattice plane. Lattice structures with non-gradient side surfaces, meaning $\alpha=0$, produce the best results.

If the lattice structure is injection-moulded, for example, then angles with $\alpha=0$ are realisable with a major effort only so that the angle of inclination for ensuring the mould release capability must lie at values >0. In this case, angles >12°, preferably >4°, particularly >3° should not be exceeded because large angles indicate an immediate influence on the flow-through properties of the lattice structure.

If the lattice structure is applied for the passage of liquid against gas, particularly water against air, it is preferred that the ribs are located at least on the side facing the gas end.

With the use of water against air the embodiment as already described, according to which the ribs of the first group alternate with ribs of the second group in a regular sequence for the formation of a rib arrangement, is particularly preferred.

This is possibly attributable to the fact that flow channels are formed between the ribs, where at first the narrow channels between the ribs of the second group and/or the ribs of the second and the first group and then, with a further flow-through, the wide channels between the ribs of the first group become effective in which the narrow partial flows from the narrow channels unite before they leave the lattice structure.

Preferably and for this application purpose, the lattice structure is manufactured from hydrophilic material, particularly hydrophilic synthetic material such as, for example, polyamide.

Hydrophilic materials are understood to mean such materials which, in contact with water, indicate a contact angle of $\theta<80°$.

When the lattice structure is disposed horizontally and filled with water vertically from above against the air below the lattice structure, the gravity of the water and the capillary forces in the channels take effect in the same direction, wherein the capillary force is the larger, the smaller the wall inclination of the side surfaces of the ribs is, i.e. $\alpha$.

If the lattice structure is applied for the passage of gas against liquid, particularly air against water, it is preferred that the ribs are located at least on the side facing the liquid.

For this application the lattice structure preferably consists of hydrophobic material, in particular hydrophobic-synthetic materials such as, for example, polypropylene.

Hydrophobic materials are understood to mean such materials which, in contact with water, indicate a contact angle of $\theta>100°$.

With a horizontal arrangement of the lattice structure and application with air against a water column standing above the lattice structure it is also essential that the capillary force, which in this case acts against the gravity of the water column, is as large as possible so that the air can escape upwards and through the lattice structure.

The lattice structures according to the invention are preferably used as components in vessels for water treatment.

Such a vessel, which can be a filter cartridge in particular, is provided in each case with at least one water inlet window, one water outlet window and one air outlet window, at least the water inlet window and the air outlet window being provided with lattice structures according to the invention.

If the vessel referred to here is a filter cartridge, then this is filled with a filter medium. The untreated water flowing in through the water inlet window flows into the interior of the filter cartridge, then flows through the filter medium and leaves the filter cartridge through the water outlet window as filtered water. The essential aspect in this case is that, at the beginning of the water filtration, the water can make its way without obstructions and delays through the water inlet window and into the filter cartridge. Then again the air, which lies above the filter medium within the filter cartridge, must be capable of escaping just as quickly through the air outlet window.

This is ensured by means of the lattice structures according to the invention, the lattice openings with dimensions of $\leq 300$ μm effectively holding back the particles of the filter medium.

The lattice structure of the water inlet window preferably consists of a hydrophilic synthetic material, and the lattice structure of the air outlet window consists of a hydrophobic synthetic material. The vessel itself is manufactured preferably from one of the two synthetic materials.

The vessel is preferably manufactured with the two-component injection moulding method.

BRIEF DESCRIPTION OF THE DRAWINGS

Exemplary embodiments of the invention are explained as follows in greater detail on the basis of the drawings. The drawings show the following:

FIG. 7: a perspective view of a lattice structure according to a further embodiment, FIG. 8: an enlarged section of a lattice structure through which a liquid flows, FIG. 10: a top view onto the filter cartridge shown in FIG. 9.

DETAILED DESCRIPTION OF THE INVENTION

Figure 1:
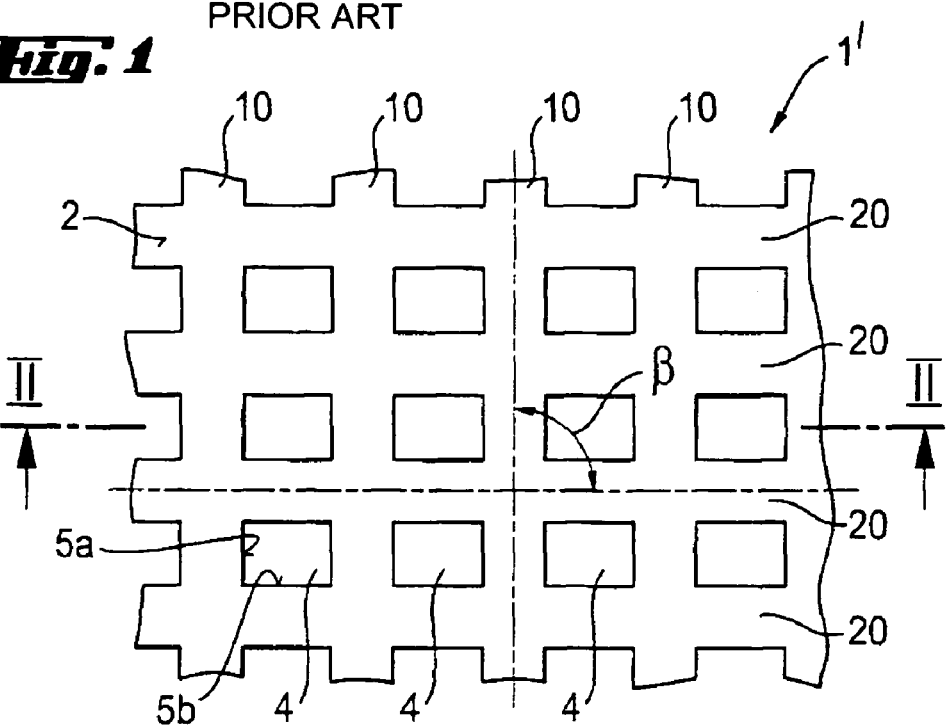
FIG. 1: a top view onto a section of a lattice structure according to the state of the art.

FIG. 1 shows the top view onto the upper side 2 of a section of a lattice structure 1' according to the state of the art, consisting of inter-crossing longitudinal webs 10 and transverse webs 20. The transverse and longitudinal webs 10, 20 cross each other at an angle of $\beta=90°$. The openings 4 arranged between the webs 10, 20 are rectangular in shape and have narrow sides 5a and longitudinal sides 5b. The spacing of the narrow sides 5a lies below 300 μm.

Figure 2:
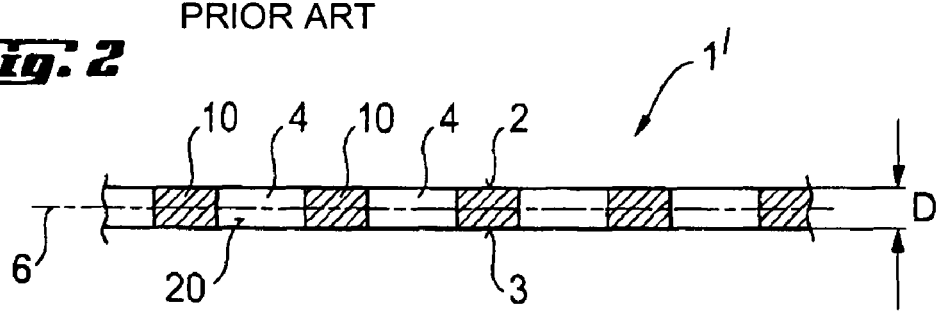
FIG. 2: a section along the line II-II through the lattice structure as shown in FIG. 1, FIG. 3: a section through a further lattice structure according to the state of the art.

FIG. 2 shows a section along the line II-II through the lattice structure 1' shown in FIG. 1. It can be seen that the webs 10 and 20 have the same thickness D and are located in the same plane.

Figure 3:
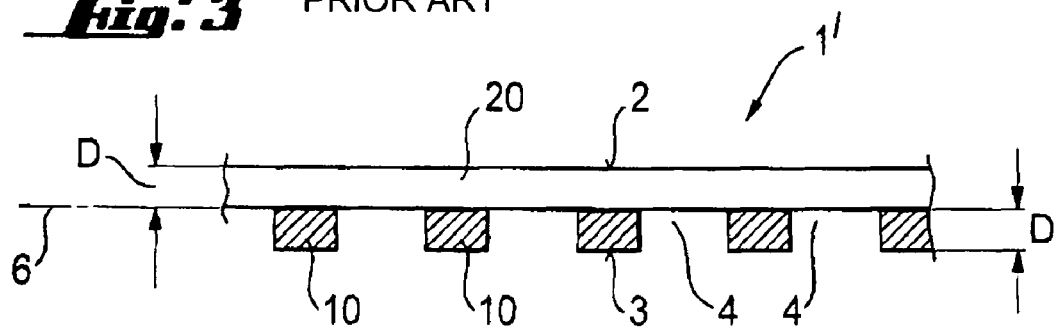

FIG. 3 shows a further embodiment of a known lattice structure 1' where the longitudinal webs 10 are located in one plane and the transverse webs 20 are located in an offset plane, both planes being offset by the thickness of the webs 10, 20. It can be seen that these webs 10, 20 are formed as flat webs.

Figure 4:
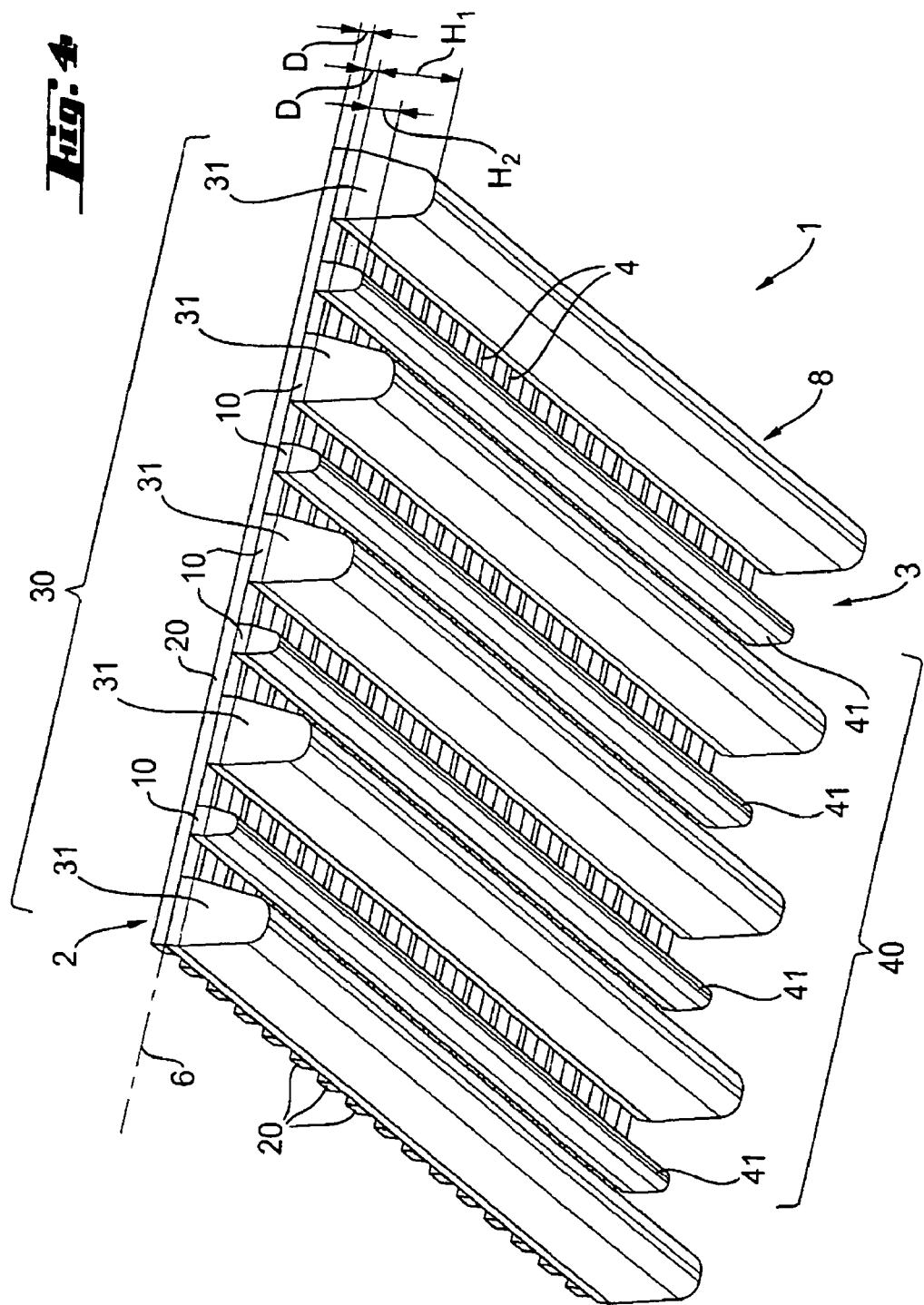
FIG. 4: a perspective view of a lattice structure according to the invention.

According to the invention, ribs 31, 41 are arranged on such a known lattice structure 1', as illustrated in FIG. 4, which shows a perspective view of the underside 3 of a lattice structure 1 according to the invention. The transverse webs 20 correspond to the transverse webs from FIG. 3, first ribs 31 and second ribs 41 being arranged on the longitudinal webs 10 from FIG. 3, which ribs extend vertically and downwards to the lattice plane 6. The first ribs 31 belong to the first group 30 and have the height $H_1$. The second ribs 41 form the second group 40 with the rib height $H_2$. In the rib arrangement 8 as shown in FIG. 4, the first ribs 31 are arranged in an alternating manner to the ribs 41. The width of the webs 10 is adapted to the width of the ribs 31 and 41, respectively. Based on the larger height $H_1$ of the ribs 31, the relevant webs 10 are formed correspondingly wider than the webs 10, on which the smaller ribs 41 are located.

Figure 5:
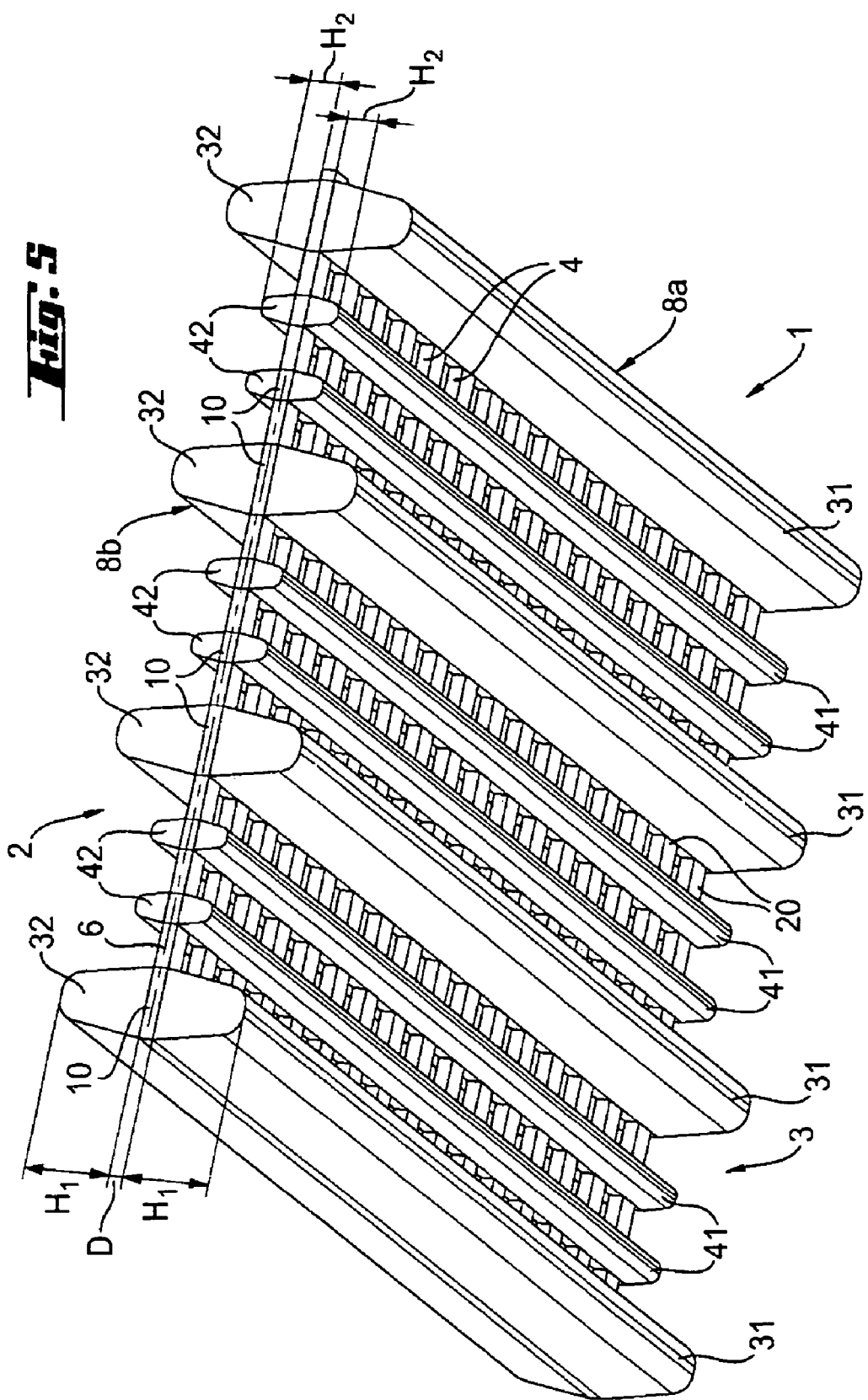
FIG. 5: a perspective view of a lattice structure according to a further embodiment.

FIG. 5 shows a further embodiment where the lattice structure 1 has a rib arrangement 8b on the upper side 2 and a rib arrangement 8a on the underside 3. As different to FIG. 4, the ribs 31 alternate with two ribs 41 in each case and/or ribs 32 with two ribs 42 in each case. All ribs, both on the upper side 2 as well as on the underside 3, are located on the longitudinal webs 10. In this way, a symmetrical lattice structure 1 is established. The transverse webs 20 are, as ever, formed as flat webs and have no rib arrangement. Whereas according to FIG. 4 the webs 10 and 20 are arranged in offset planes, all webs 10, 20 are arranged in the same plane according to FIG. 5. Subsequently, the web structure corresponds to that according to FIG. 1 and FIG. 2, respectively.

Figure 6:
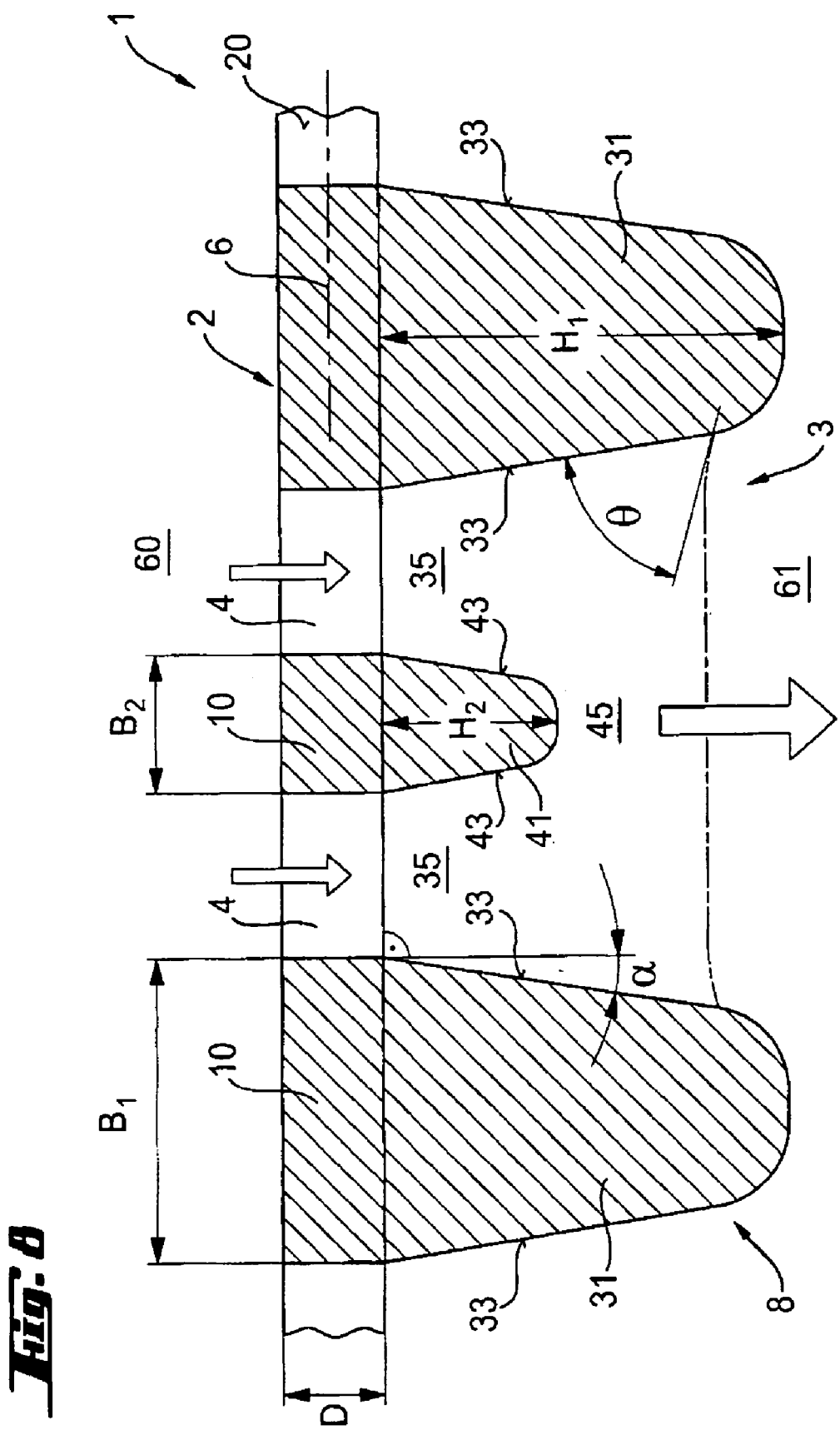
FIG. 6: a perspective view of a lattice structure according to a further embodiment.

FIG. 6 shows a further embodiment, the rib arrangement 8a on the underside of the lattice structure 1 corresponding to the illustration in FIG. 4. The same rib structure is also located on the upper side 3 of the lattice structure 1 and forms the rib structure 8b, the rib structure 8b being turned and arranged at an angle of β=90° compared with the rib structure 8a. This means that the ribs of the rib structure 8a are located on the longitudinal webs 10 and the rib structure 8b is located on the transverse webs 20. A particularly stable embodiment of the lattice structure 1 is established in this way.

FIG. 7 shows section-wise a further embodiment, where both the longitudinal webs 10 as well as the transverse webs 20 have ribs 31 of the first group 30 and ribs 41 of the second group 40. In each case, two ribs 41 of the second group 40 alternate with a rib 31 of the first group 30 in both directions. Subsequently, a square division of the lattice structure 1 is obtained.

FIG. 8 shows in an enlarged form a section from the rib arrangement 8 as shown in FIG. 4 for the purpose of explaining the details of the ribs 31, 41 and the water flow. In contrast to FIG. 4, the webs 10, 20 are located in the same plane.

The ribs 31, 41 have on their base the widths $B_1$ and $B_2$, respectively, and have side surfaces 33 and 43 in each case, which form an angle α with the vertical 7 on the lattice plane 6.

From the upper side 2, water is supplied through the openings 4 from the water space 60 against the gas space 61 located under the lattice structure 1. The water flows through the openings 4 and at first into the narrow channels 35, formed between the ribs 41 and the ribs 31, in the downward direction. Underneath the rib 41, the partial flows coming from the narrow channels 35 unite in channel 45, which is formed between the two ribs 31. The resulting stream flows downwards in the direction of the arrow.

Based on the hydrophilic materials as used for the ribs 31 and 41, a contact angle θ is formed between the liquid and the side wall 33, and this angle is in the region of approx. 70°.

Based on this channel formation through the ribs 31 and 41, there is a non-obstructed passage through the lattice structure 1.

Typical values for the heights $H_1$, $H_2$ of the ribs are in the range of 0.5 to 2 mm, particularly at 0.5 to 1.5 mm. The rib widths at the base, corresponding to the web width, are in the range of 0.3 to 1.5 mm, preferably in the range of 0.3 to 1.1 mm.

Figure 9:
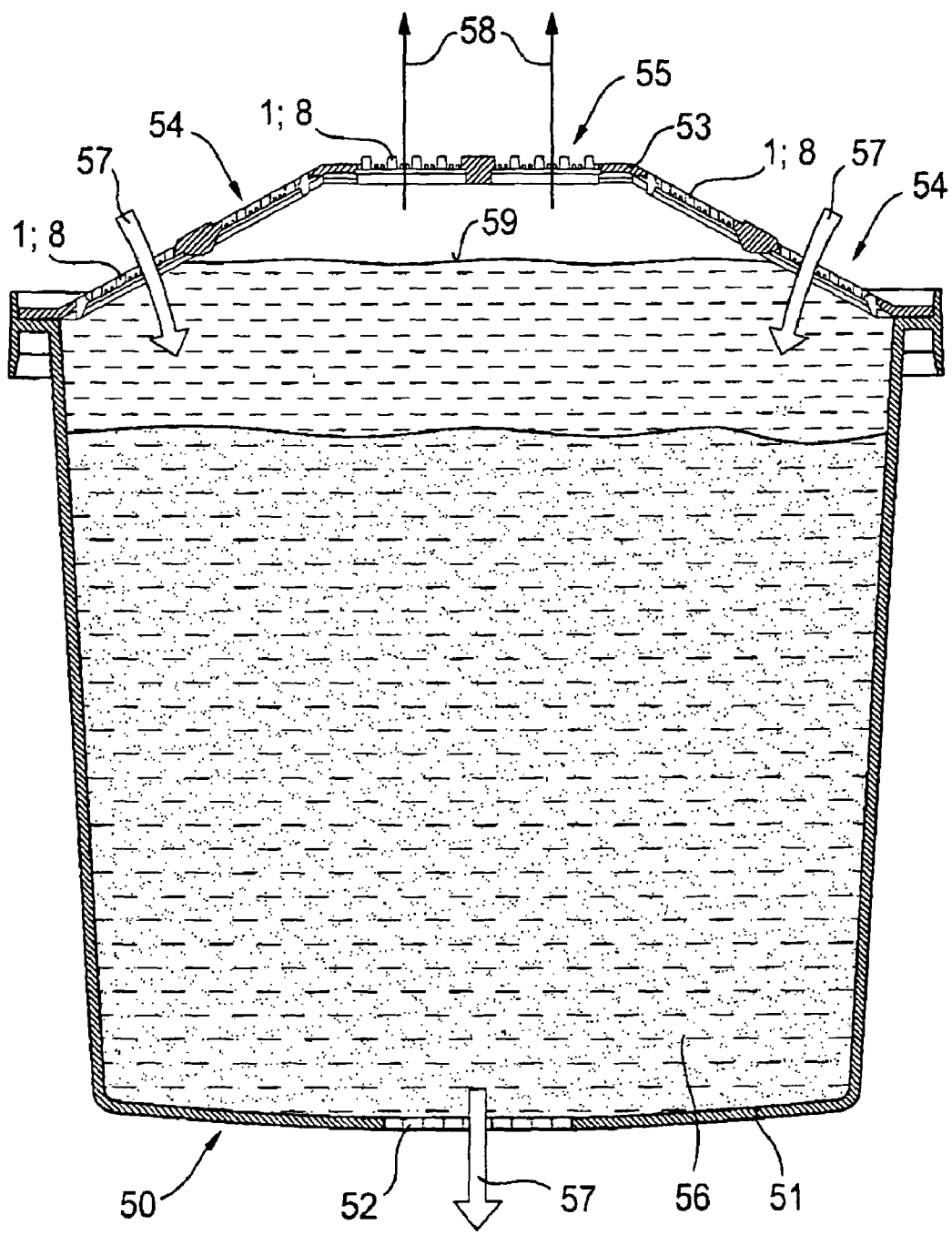
FIG. 9: a vertical section through a filter cartridge.

FIG. 9 shows a vessel 50 in the form of a filter cartridge in the cross-section. The filter cartridge consists of a beaker 51 in the bottom wall of which a water outlet window 52 is arranged. The beaker 51 is filled with filter medium 56. To the top, the beaker 51 is closed off with a cover 53. The cover 53 that can be seen in FIG. 10 in top view has on the side two water inlet windows 54 and an air outlet window 55 located between both water inlet windows 54.

During the filtration operation, the water flows in the direction of arrow 57 through the windows 54 into the interior of the vessel 50 where, at first, the water level 59 rises. The air 58 is pressed upwards and exits through the air outlet window 55.

In the case that there is already water located in the space above the cover 53, the air must exit against the water, located above it, to the top. The windows 54 and the window 55 are each equipped with the lattice structures 1 according to the invention.

It can be seen in the top view according to FIG. 10 that the ribs 31 alternate with two ribs 41 in each case. Based on the lattice structures 1 according to the invention, the water flows without any problems into the interior of the vessel 50 and the air can escape just as quickly through the air outlet window 55 in the upward direction. A delay during the admission and exit, respectively, or even a blockage of the windows is effectively avoided by the structure according to the invention.

REFERENCE NUMBERS LIST

1 Lattice structure
1' Lattice structure, state of the art
2 Upper side
3 Underside
4 Opening
5a Narrow side
5b Longitudinal side
6 Lattice level
7 Verticals on the lattice level
8 Rib arrangement
8a, b Rib arrangement
10 Longitudinal web
20 Transverse web
30 First group
31 First rib
32 First rib
33 Side surface
35 Channel
40 Second group
41 Second rib
42 Second rib
43 Side surface
45 Channel
50 Vessel
51 Beaker
52 Water outlet window
53 Cover
54 Water inlet window 55 Air outlet window
56 Filter medium
57 Water flow direction
58 Air flow direction
59 Water level
60 Water space
61 Gas space
α Angle of the side surfaces 33/34
β Angle of the longitudinal and transverse webs 10, 20
θ Contact angle
$H_1$ Height of the ribs 31, 32
$H_2$ Height of the ribs 41, 42
$B_1$ Width of the ribs 31
$B_2$ Width of the ribs 41
D Thickness of the webs 10, 20

What is claimed is:

1. A lattice structure comprising: a hydrophilic material for the passage of a liquid through the lattice structure against a gas space situated at an outflow side,
wherein the lattice structure has transverse webs and longitudinal webs which together form an angle β between 80° and 100°, lattice openings with a clear width of ≦300 μm being arranged between the transverse webs and the longitudinal webs,
wherein on the side of the lattice structure turned toward the gas space, the transverse webs or the longitudinal webs have a rib arrangement of ribs projecting vertically to a lattice plane, and
wherein the rib arrangement has at least a first group and a second group of ribs, which differ from one another at least by their rib heights $H_1$, $H_2$ with $H_1 > H_2$.

2. The lattice structure according to claim 1, wherein the ribs of the first group alternate with ribs of the second group in a regular sequence and form the rib arrangement.

3. The lattice structure according to claim 2, wherein in each case, two ribs of the second group alternate with one rib of the first group.

4. The lattice structure according to claim 1, wherein the rib arrangement is located on the longitudinal webs and the transverse webs.

5. The lattice structure according to claim 1, wherein the lattice structure has the same rib arrangement on both sides.

6. The lattice structure according to claim 1, wherein the rib arrangement of the one side is turned by the angle β compared with the rib arrangement of the other side.

7. The lattice structure according to claim 1, wherein $H_2 \leq \frac{3}{4} H_1$ applies for the rib heights.

8. The lattice structure according to claim 1, wherein, $H_2 \leq \frac{1}{2} H_1$ applies for the rib heights.

9. The lattice structure according to claim 1, wherein $H_2 \leq \frac{1}{3} H_1$ applies for the rib heights.

10. The lattice structure according to claim 1, wherein a width $B_1$ of the webs with ribs of the first group is larger than or equal to a width $B_2$ of the webs with ribs of the second group.

11. The lattice structure according to claim 1, wherein side surfaces of the ribs have an angle of inclination α with $0° \leq \alpha \leq 12°$.

12. The lattice structure according to claim 11, wherein $0° \leq \alpha \leq 4°$ applies for the angle of inclination.

13. The lattice structure according to claim 11, wherein $0° \leq \alpha \leq 3°$ applies for the angle of inclination.

14. The lattice structure according to claim 11, wherein $3° \leq \alpha \leq 4°$ applies for the angle of inclination.

15. The lattice structure according to claim 1, wherein the lattice structure consists of injection molded plastic.

16. The lattice structure according to claim 1, wherein the lattice structure consists of hydrophilic plastic.

17. A vessel according to claim 15, wherein the injection molded plastic is 2-component injection molded plastic.

18. A lattice structure comprising: a hydrophobic material for the passage of a gas through the lattice structure against a liquid space situated at an outflow side,
wherein the lattice structure has transverse webs and longitudinal webs which together form an angle β between 80° and 100°,
wherein lattice openings with a clear width of 300 μm are arranged between the transverse webs and the longitudinal webs,
wherein on the side of the lattice structure turned toward the liquid space, the transverse webs or the longitudinal webs have a rib arrangement of ribs projecting vertically to a lattice plane, and
the rib arrangement has at least a first group and a second group of ribs, which differ from one another at least by their rib heights $H_1$, $H_2$ with $H_1 > H_2$.

19. The lattice structure according to claim 18, wherein the lattice structure consists of hydrophobic plastic.

20. The lattice structure according to claim 18, wherein the ribs of the first group alternate with ribs of the second group in a regular sequence and form the rib arrangement.

21. The lattice structure according to claim 18, wherein in each case, two ribs of the second group alternate with one rib of the first group.

22. The lattice structure according to claim 18, wherein the rib arrangement is located on the longitudinal webs and the transverse webs.

23. The lattice structure according to claim 18, wherein the lattice structure has the same rib arrangement on both sides.

24. The lattice structure according to claim 18, wherein the rib arrangement of the one side is turned by the angle β compared with the rib arrangement of the other side.

25. The lattice structure according to claim 18, wherein $H_2 \leq \frac{3}{4} H_1$ applies for the rib heights.

26. The lattice structure according to claim 18, wherein a width $B_1$ of the webs with ribs of the first group is larger than or equal to a width $B_2$ of the webs with ribs of the second group.

27. The lattice structure according to claim 18, wherein side surfaces of the ribs have an angle of inclination a with $0° \leq \alpha \leq 12°$.

28. The lattice structure according to claim 18, wherein $0° \leq \alpha \leq 4°$ applies for the angle of inclination.

29. The lattice structure according to claim 18, wherein the lattice structure consists of injection molded plastic.

30. A vessel according to claim 29, wherein the injection molded plastic is 2-component injection molded plastic.

31. A vessel, comprising: at least one water inlet window, one water outlet window and one air outlet window, at least the water inlet window and the air outlet window being provided with a lattice structure, having transverse webs and longitudinal webs between which lattice openings with a clear width of ≦300 μm are arranged,
wherein the lattice structure of the water inlet window consists of a hydrophilic material and the lattice structure of the air outlet window consists of a hydrophobic material,
wherein on the side of the lattice structure of the water inlet window turned toward the air space and on the side of the lattice structure of the air outlet window turned toward a water space, the transverse webs or the longitudinal webs have ribs projecting vertically to a lattice plane, wherein a rib arrangement has at least a first group and a second group of ribs being arranged, which differ from one another by their heights $H_1$, $H_2$ with $H_1 > H_2$.

32. The vessel according to claim 31, wherein the lattice structure of the water inlet window consists of a hydrophilic plastic and the lattice structure of the air outlet window consists of a hydrophobic plastic.

33. The vessel according to claim 32, wherein the vessel consists of the plastic material of either the water inlet window or the air outlet window.

34. The vessel according to claim 31, wherein the vessel is formed from 2-component injection molded material.

35. A vessel according to claim 31, wherein the vessel is a filter cartridge.

* * * * *

UNITED STATES PATENT AND TRADEMARK OFFICE
CERTIFICATE OF CORRECTION

PATENT NO.        : 8,021,548 B2  Page 1 of 1
APPLICATION NO.   : 12/086845
DATED             : September 20, 2011
INVENTOR(S)       : Gröss et al.

It is certified that error appears in the above-identified patent and that said Letters Patent is hereby corrected as shown below:

IN THE CLAIMS:

In claim 18, column 8, line 11, please insert --≤-- before "300".

In claim 27, column 8, line 45, after inclination, "a" should be --α--.

Signed and Sealed this
Thirteenth Day of December, 2011

David J. Kappos
*Director of the United States Patent and Trademark Office*